(12) United States Patent
Glejbøl et al.

(10) Patent No.: US 7,302,973 B2
(45) Date of Patent: Dec. 4, 2007

(54) REINFORCED FLEXIBLE PIPELINE HAVING A THERMAL BARRIER

(75) Inventors: Kristian Glejbøl, Glostrup (DK); Jakob Wedel-Heinen, Charlottenlund (DK)

(73) Assignee: NKT Flexibles I/S, Brondby (DK)

( * ) Notice: Subject to any disclaimer, the term of this patent is extended or adjusted under 35 U.S.C. 154(b) by 517 days.

(21) Appl. No.: 10/476,896

(22) PCT Filed: Apr. 30, 2002

(86) PCT No.: PCT/DK02/00276

§ 371 (c)(1),
(2), (4) Date: May 13, 2004

(87) PCT Pub. No.: WO02/090818

PCT Pub. Date: Nov. 14, 2002

(65) Prior Publication Data

US 2004/0194838 A1 Oct. 7, 2004

(30) Foreign Application Priority Data

May 4, 2001 (DK) ................ 2001 00704
Mar. 5, 2002 (DK) ................ 2002 00338

(51) Int. Cl.
*F16L 11/16* (2006.01)
(52) U.S. Cl. .............. 138/135; 138/134; 138/129; 138/131
(58) Field of Classification Search ............. 138/131, 138/134, 135, 172, 129, 130, 138
See application file for complete search history.

(56) References Cited

U.S. PATENT DOCUMENTS 4,673,002 A 6/1987 Scanlon et al. ............. 138/149

5,307,842 A 5/1994 Lequeux ................ 138/149

(Continued)

FOREIGN PATENT DOCUMENTS

DK 2912039 10/1980

(Continued)

OTHER PUBLICATIONS

"Coflon material insulates flexible line to 300° F.", Ocean Industry, dated Apr. 1986; p. 100.

(Continued)

*Primary Examiner*—Patrick F. Brinson
(74) *Attorney, Agent, or Firm*—Merchant & Gould

(57) ABSTRACT

A reinforced flexible pipeline (1), which has an inner liner (3) whose inner side engages an inner reinforcement layer (2) that may be formed by a so-called carcass, and on whose outer side at least a strength-imparting reinforcement layer (4, 5, 6, 7) is provided, has an additional barrier layer (9, 10, 11) which is arranged between the inner liner and the inner reinforcement layer. The additional barrier layer is thermally insulating and/or chemically protecting. The additional barrier layer may be formed as a tape (9) which is wound around the inner reinforcement layer, or may be composed of locking profiles (10, 11) which are wound around the flexible pipeline in a helix. The additional barrier layer (9, 10, 11) may be made completely or partly of a polymer which may be thermoplastic, or is cross-linked completely or partly. Hereby, the pipe may be protected against temperatures above e.g. 13° C. and may also be protected against attacks from methanol that contains water. By constructing the additional barrier layer of profiles it is additionally ensured that it can transfer great compressive forces to the inner reinforcement layer, without any risk of the liner being caused to float since it is supported evenly by the additional barrier layer.

10 Claims, 3 Drawing Sheets

U.S. PATENT DOCUMENTS

Figure 1:
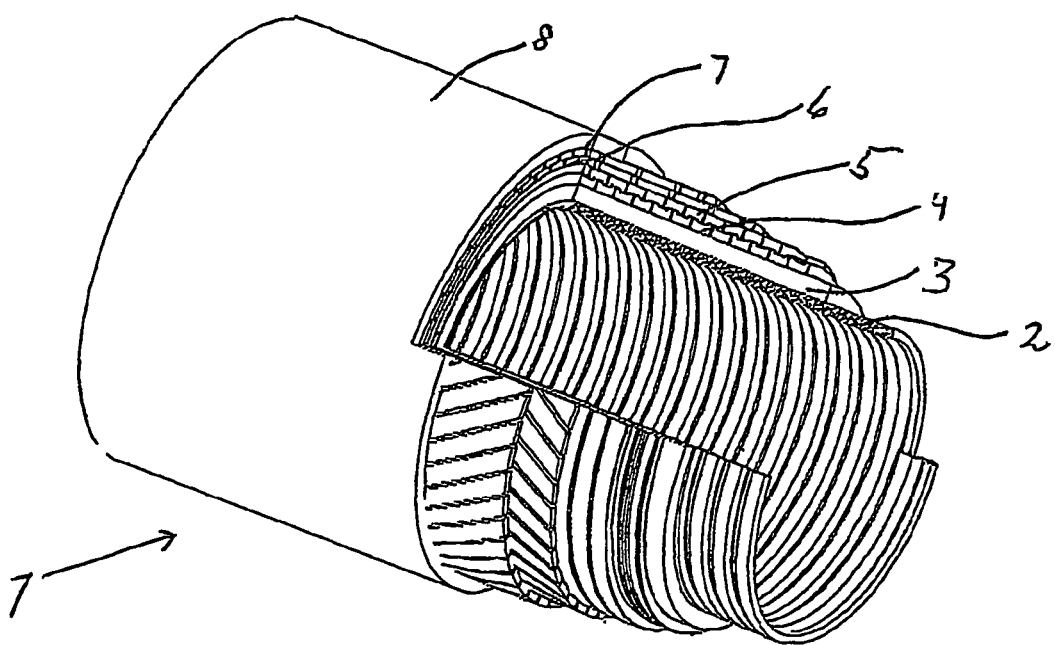

| | | | |
|---|---|---|---|
| 5,934,335 A * | 8/1999 | Hardy | 138/131 |
| 6,065,501 A * | 5/2000 | Feret et al. | 138/134 |
| 6,192,941 B1 * | 2/2001 | Mallen-Herrero et al. | 138/135 |
| 6,227,250 B1 | 5/2001 | Coutarel | 138/149 |
| 6,354,333 B1 * | 3/2002 | Dupoiron et al. | 138/135 |
| 6,739,355 B2 * | 5/2004 | Glejbøl et al. | 138/135 |
| 6,889,718 B2 * | 5/2005 | Glejbøl et al. | 138/135 |

FOREIGN PATENT DOCUMENTS

| | | |
|---|---|---|
| EP | 1179157 | 2/2002 |
| EP | 1384026 | 1/2004 |
| WO | WO 0161231 | 8/2001 |

OTHER PUBLICATIONS

"Notice Of Opposition", dated Apr. 19, 2006 to European Patent 1,384,026, 14 pages.

"Reply To Opposition Against EP 1,384,026", NKT Research, dated Sep. 27, 2006, 3 pages.

* cited by examiner

REINFORCED FLEXIBLE PIPELINE HAVING A THERMAL BARRIER

The invention relates to a reinforced flexible pipeline comprising an inner liner on whose inner side an inner reinforcement layer is provided, and on whose outer side at least a pressure and/or tension absorbing layer is provided.

Such types of pipes are used for the transport of recovered fluids between installations at an oil field, and for the transport of process liquids between an installation positioned at the surface of the sea and an installation positioned below the surface of the sea.

A common type of the above-mentioned pipes has a tight inner liner on whose inner side a reinforcement layer, frequently called a carcass, is arranged, the purpose of which is to prevent the inner liner from collapsing because of external pressure impacts.

Externally on the inner liner there is an outer reinforcement layer which may consist of various types of elements that can be locked to each other.

The traditionally used form of locking elements for the inner pressure reinforcement layer consists of folded metal strips which are wound in a helix. Precisely in this embodiment, the reinforcement frequently consists of a single metal strip which is folded so as to be secured to itself.

In more recent inner reinforcement layers, these consist of wound profiles of e.g. X- or K-profiles which may be locked to each other by means of C-profiles.

One or more load-carrying reinforcement layers are arranged externally on the inner reinforcement layer and the inner liner.

These load-carrying reinforcement layers are sometimes also referred to as pressure reinforcement layers, tension reinforcement layers or cross reinforcement layers.

These layers will be called "the outer reinforcement layer" below.

A typical embodiment of the outer reinforcement layer is that it is composed of two layers arranged on top of each other, where the layer closest to the inner liner is of a nature such that it absorbs radial forces in the pipe (pressure reinforcement layer), while the overlying reinforcement layer primarily absorbs axial forces in the pipe (tension reinforcement layer).

Finally, the outer reinforcement layer may have arranged externally thereon a tight jacket, which, however, is omitted in more recent structures, which therefore means that the outer reinforcement layer is freely exposed to the surroundings.

In step with the wish for recovering oil at ever greater depths of water and the wish for being able to transport fluids at very high temperatures, ever greater requirements are made with respect to the properties of the reinforced flexible pipes.

The currently used pipes may be employed at very great depths of water, which has been feasible because all layers of the pipe structure have gone through a constant development both as regards constructive structure and selection of material.

Even though these pipes are extremely resistant to mechanical impacts, there are limits as to how high a temperature the fluid to be transported in the pipe may have. This temperature, which may vary according to local conditions, may generally not be cooled below about 70° C., since, otherwise, plugging may occur in the pipe because of formation of hydrate and condensation of paraffin.

The maximum temperature which the commercially available flexible pipes can resist is about 130° C., but pipes capable of resisting higher temperatures are desirable.

The reason is that the high temperature after the oil has been transported through the pipe, is useful in the further processing.

Till now, it has been necessary to cool the oil before it is transported through the pipe to below about 130° C., and then, after it has been transported through the pipe, to re-heat it for the further processing and/or transport.

It is evident that cooling and subsequent heating of the oil demand considerable resources and result in an unnecessary waste of energy.

It is also a requirement in the dimensioning of pipes of the above-mentioned type that they are resistant to chemical impacts, which is known e.g. in the transport of methanol that contains water.

In such cases, a pipe capable of resisting high temperatures will not always be capable of also resisting chemical attacks from the fluid transported in the pipe.

U.S. Pat. No. 4,673,002 describes a flexible pipe, primarily for the transport of hot combustion products, which is composed of four layers, of which one is a partly permeable insulating layer disposed between a tight layer and an inner material fibre layer, defining the flow path of this flexible pipe.

The various layers of this flexible pipe according to the US patent are constructed in accordance with quite different constructional principles.

Thus, it does not involve a flexible pipe having a tension and/or pressure reinforcement or an inner reinforcement layer which the flexible pipe according to the present invention has.

Accordingly, an object of the invention is to provide a pipe which is dimensioned to transport fluids in given temperature ranges, and which is simultaneously capable of resisting chemical attacks from the fluid transported in the pipe.

The object of the invention is achieved in that a pipe of the type stated in the introductory portion of claim 1 is characterized in that an additional barrier layer is arranged between the inner barrier layer and the liner, and that the additional barrier layer is thermally insulating and/or chemically protecting.

Hereby, the pipe will be able to resin temperatures which as in a given temperature range, and will also be able to resist chemical impacts from the fluid transported in the pipe, it being possible for the additional barrier layer and the inner liner to be dimensioned to desired operational conditions.

The additional barrier layer is formed as a tape wound around the inner reinforcement layer, which gives a solution advantageous in terms of production, since the tape may be wound during the manufacture of the inner reinforcement layer, and the process of the subsequent extrusion of the inner liner is easier to perform, since the extrusion takes place on a smooth surface.

If reinforcement of the pipe is additionally desired, it is an advantage if the additional reinforcement layer is composed of profiles.

Expedient embodiments of the profile composition are defined in claims 4-8.

When, as stated in claim 9, the additional barrier layer is made completely or partly of a polymer, it is possible to place the additional barrier layer close to the inner liner, thereby obviating the occurrence of unsupported parts of the inner liner, which might be able to float when subjected to pressure, with the consequent risk of the inner liner becoming leaky.

In particular, if the profiles are joined as a profile of a

The reinforced flexible pipeline according to the invention comprises an Inner liner on whose inner side an inner reinforcement layer (2) is provided, and on whose outer side an outer reinforcement layer comprising at least a layer selected from the group consisting of pressure absorbing layer and tension absorbing layer is provided, wherein an additional barrier layer is arranged between the inner reinforcement layer and the liner, and that the additional barrier layer is thermally insulating and is composed of profiles made completely or partly of a polymer.

In one embodiment the additional barrier layer is formed by at least a layer of geometrically locking profiles.

In one embodiment the profiles of the additional barrier are locked mechanically to each other.

In one embodiment the profiles of the additional barrier layer are locked geometrically to the inner reinforcement layer.

In one embodiment the profiles are wound around the pipeline in a helix.

In one embodiment the profiles are C, Z-, T-, K- or X-shaped.

In one embodiment the profiles are joined as a profile of a polymer material which is locked with a profile of another material, such as steel. polymer material which is locked with a profile of another material, such as steel, an advantage in terms of production is achieved, as it is possible to use profiles which are used in the construction of a pressure reinforcement of a pipe.

The additional barrier layer can max. absorb 50% drilling fluid, it is ensured that the additional barrier layer can absorb the very great compressive forces which are applied to the pipe inter alia during laying because of the use at great depths of water.

The additional barrier layer does not have a great tightness toward the fluids of the surroundings, it is ensured that the pressure load caused by the fluid flowing in the pipe acts hydrostatically on the individual profiles, and therefore a destructive build-up of pressure between the inner liner and the additional barrier layer is not possible.

Figure 2:
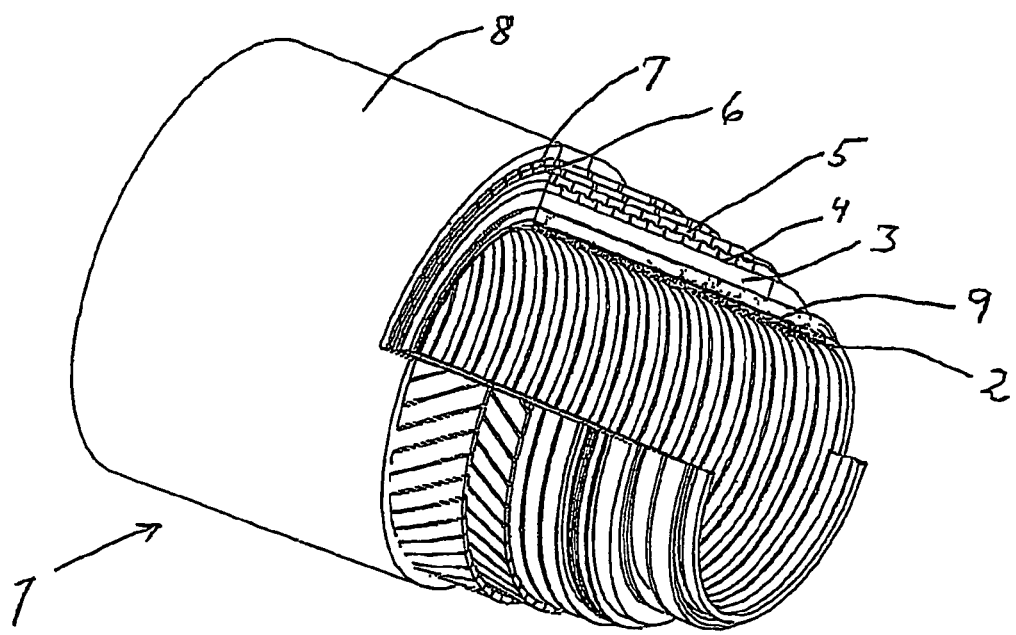
Figure 3:
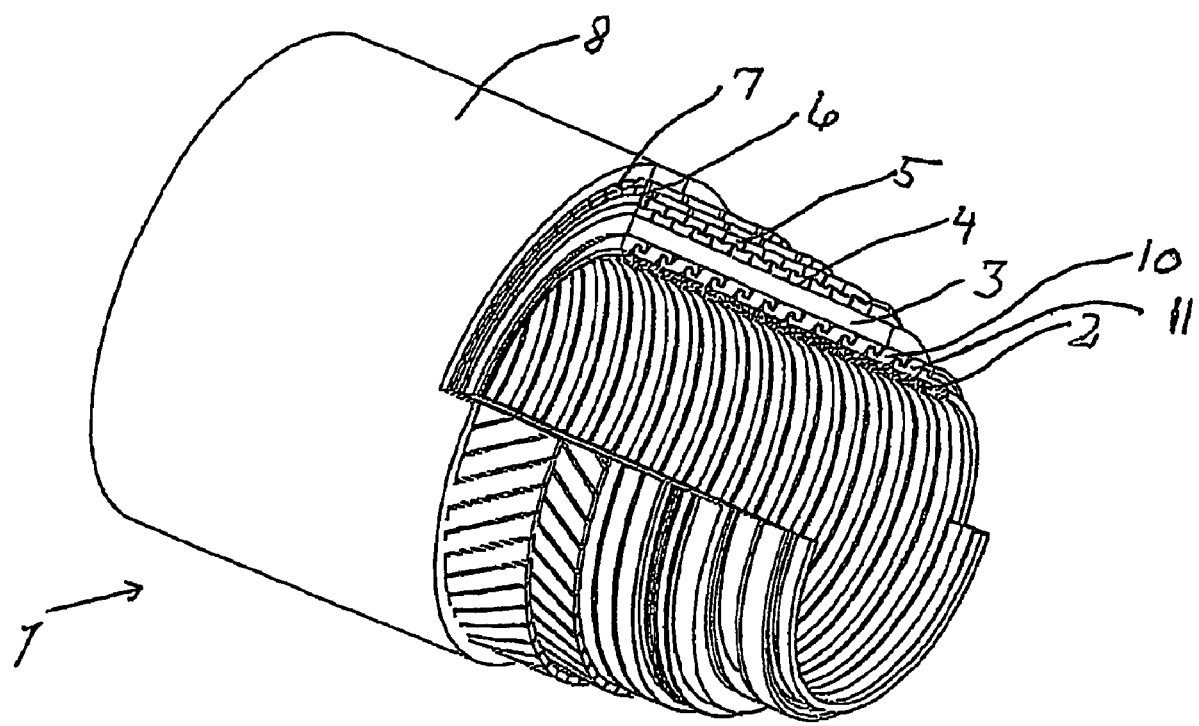

The invention will now be explained more fully with reference to the drawing in which FIG. 1 is a partially sectional view of an ordinary structure of a flexible pipe for the transport of fluids, FIG. 2 is a partially sectional view of a first embodiment of a pipe according to the invention with an additional barrier layer according to the invention, while FIG. 3 is a partially sectional view of a second embodiment of a pipe according to the invention with an additional barrier layer according to the invention.

Figure 4:
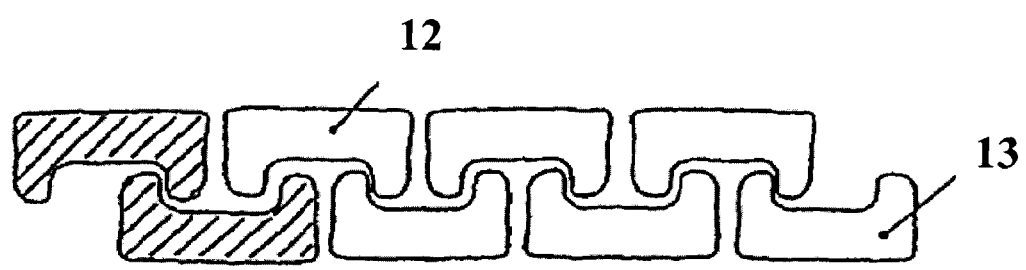

FIG. 4 is a partially sectional view of the second embodiment showing the profiles of the additional barrier layer locked mechanically to each other.

In one embodiment the polymer of the additional barrier layer contains at least 50% by volume of a polyolefin, a polyketone, a halogen-substituted polyolefin, a polyphenylene compound or a mixture of these.

In one embodiment the polymer of the additional barrier layer is cross-linked completely or partly.

In one embodiment the additional barrier layer is made of PEX, PVDF or of polypropylene.

The use according to the invention of a reinforced flexible pipeline for transporting oil with a temperature above 130° C. wherein the pipeline comprises an inner liner on whose inner side an inner reinforcement layer is provided, and on whose outer side an outer reinforcement layer comprising at least a layer selected from the group consisting of pressure absorbing layer and tension absorbing layer is provided, wherein an additional barrier layer is arranged between the inner reinforcement layer and the liner (3), the additional barrier layer is sufficiently thermally insulating to keep the inner liner with a temperature of below 130° C.

The flexible pipe, which is generally designated 1 in FIG. 1, is composed of an inner reinforcement layer 2.

This reinforcement layer may be composed of folded and wound steel strips, without being tight, however.

Such a reinforcement layer is also called a carcass.

The reinforcement layer 2 protects a tight inner liner 3 externally on said layer, so that the inner liner does not collapse e.g. because of great external hydrostatic pressures. This inner liner ensures that no fluids are transported from the interior of the pipe toward the surroundings, or vice versa.

The inner liner may e.g. be made of PVDF if it is to be capable of resisting high temperatures.

However, it may also be made of the somewhat cheaper PA-11 if the requirements with respect to temperature conditions are not as strict.

An outer reinforcement layer, shown here as being composed of a pressure reinforcement layer and a tension reinforcement layer, is wound externally on the inner liner. The pressure reinforcement layer is composed of C-profiles 4, 5 in this example. Other profiles, such as Z-profiles or K- or X-profiles locked by means of C-profiles, may be used as well.

Externally on the reinforcement layer there is arranged a tension reinforcement layer which, as shown, consists of helically wound profiles 6, 7 which are at suitable angles.

Finally, a tight jacket 8 is arranged externally on the outer reinforcement layer.

It is noted that the flexible pipe according to FIG. 1 shows an embodiment of a type that may occur in many variants.

For example, the mentioned layers may have interposed between them other layers which give the pipe a special functionality which is important to a given use.

Optionally, the outer jacket may be omitted completely, thereby providing a flexible pipe which has the outer reinforcement layer exposed to the surroundings.

FIG. 2 shows the pipe of FIG. 1, but now additionally provided with an additional barrier layer 9 according to the invention.

This additional barrier layer may be wound as a tape around the inner reinforcement layer 2 and may have dimensions which are e.g. 0.5 mm wide, and have a thickness which, depending on the thermal properties of the layer, may e.g. be up to between 5 and 10 mm, but also thinner.

FIG. 3 shows a further variant of the pipe of FIG. 1, but now provided with an additional barrier layer, designated 10, 11 in FIG. 2, which is composed of profiles. As will be seen, the additional barrier layer is arranged between the inner reinforcement layer 2 and the liner 3 in this embodiment, too. The barrier layer is shown here as being composed of Z-shaped profiles 10, 11. Other types of profiles, such as C-, T-, K- or X-profiles or combinations of some of these may also be used, however.

FIG. 4 shows a sectional cut of an inner reinforcement layer 13 and a barrier layer 12, where the C-shaped profiles of the barrier layer are mechanically interlocked with the C-shaped profiles of the reinforcement layer.

For both embodiments in FIG. 2 and FIG. 3, the additional barrier layer may e.g. be made of a material which ensures that the inner liner is not subjected to harmful high temperatures, e.g. above about 130° C.

This requirement with respect to the inner liner is desired, if the inner liner per se is made of a material, such as PA-11, which does not resist very high temperatures.

The additional barrier layer may also be made of a material which resists aggressive fluids, such as methanol containing water.

Moreover, the additional barrier layer may be made of a material which gives it the property that the barrier layer can resist great compressive forces, which means that hydrostatic pressures on the inner liner 3 can be transferred to the inner reinforcement layer 2 without any risk of collapse of the inner liner.

Expedient materials having desired thermal and mechanical properties may be formed completely or partly by a polymer, which may contain 50% by volume of a polyolefin, a polyketone, a halogen-substituted polyolefin, a polyphenylene compound or a mixture of these. These polymers or polymer mixtures may be non-cross-linked, completely or partly cross-linked, depending on the desired properties of the specific situation of use.

Other materials, such as PEX, PVDF and polypropylene, may also be used.

The invention claimed is:

1. A reinforced flexible pipeline comprising:
   an inner liner on whose inner side an inner reinforcement layer is provided, and on whose outer side an outer reinforcement layer comprising at least a layer selected from the group consisting of a pressure absorbing layer and a tension absorbing layer is provided, wherein an additional barrier layer is arranged between the inner reinforcement layer and the liner, the additional barrier layer is thermally insulating and is composed of profiles made completely or partly of a polymer, and the additional barrier layer is formed by at least a layer of geometrically locking profiles.

2. A reinforced flexible pipeline according to claim 1, characterized in that the profiles of the additional barrier are locked mechanically to each other.

3. A reinforced flexible pipeline according to claim 2, characterized in that the profiles of the additional barrier layer are locked geometrically to the inner reinforcement layer.

4. A reinforced flexible pipeline according to claim 1, characterized in that the profiles are wound around the pipeline in a helix.

5. A reinforced flexible pipeline according to claim 1, characterized in that the profiles are C-, Z-, T-, K- or X-shaped.

6. A reinforced flexible pipeline comprising an inner liner on whose inner side an inner reinforcement layer is provided, and on whose outer side an outer reinforcement layer comprising at least a layer selected from the group consisting of a pressure absorbing layer and a tension absorbing layer is provided, wherein an additional barrier layer is arranged between the inner reinforcement layer and the liner, and the additional barrier layer is thermally insulating and is composed of profiles made completely or partly of a polymer, characterized in that the profiles are joined as a profile of a polymer material which is locked with a profile of another material.

7. A reinforced flexible pipeline according to claim 4, characterized in that the wound thermal barrier layer does not have a high tightness toward the fluids of the surroundings.

8. A reinforced flexible pipeline according to claim 6, characterized in that the polymer contains at least 50% by volume of a polyolefin, a polyketone, a halogen-substituted polyolefin, a polyphenylene compound or a mixture of these.

9. A reinforced flexible pipeline according to claim 6, characterized in that the polymer is cross-linked completely or partly.

10. A reinforced flexible pipeline according to claim 1, characterized in that the additional barrier layer is made of PEX, PVDF or of polypropylene.

* * * * *